United States Patent [19]
Jaramillo et al.

[11] Patent Number: 5,689,413
[45] Date of Patent: Nov. 18, 1997

[54] VOLTAGE CONVERTOR FOR A PORTABLE ELECTRONIC DEVICE

[75] Inventors: Giovanni Jaramillo, Plantation; Jose M. Aleman, Coral Springs, both of Fla.

[73] Assignee: Motorola, Inc., Schaumburg, Ill.

[21] Appl. No.: 610,037

[22] Filed: Mar. 4, 1996

[51] Int. Cl.$^6$ .................................................. H02M 1/00
[52] U.S. Cl. ................................................ 363/146; 320/2
[58] Field of Search ...................................... 363/141, 145, 363/146; 320/2

[56] References Cited

U.S. PATENT DOCUMENTS

| | | | |
|---|---|---|---|
| 4,908,569 | 3/1990 | Fest | 324/120 |
| 5,159,545 | 10/1992 | Lee | 363/146 |
| 5,369,565 | 11/1994 | Chen et al. | 363/146 |

OTHER PUBLICATIONS

"Battery and Charger In One", InCharge Company, Inc. Bellevue, WA. Appeared in the Oct. 30, 1995 issue of HFN Magazine, Riverton, NJ.

*Primary Examiner*—Peter S. Wong
*Assistant Examiner*—Rajnikant B. Patel
*Attorney, Agent, or Firm*—James A. Lamb

[57] ABSTRACT

A portable electronic device holster (105) includes an AC voltage convertor (115) having at least two AC prongs (102) extending therefrom. The AC voltage convertor (115) is captured within the holster (105) and can be extended and retracted. When a portable electronic device is inserted in the portable electronic device holster (105), the AC voltage convertor (115) is extended, and the at least two AC prongs (120) are inserted into a standard AC power socket, a voltage down convertor circuit (405) within the AC voltage convertor (115) generates a down converted voltage which is coupled to the portable electronic device. Alternatively, an AC voltage convertor (615) slidably attaches to a portable electronic device and generates a down converted voltage which is coupled to the portable electronic device when AC prongs (120) extending from the AC voltage converter (615) are inserted into a standard AC power socket.

5 Claims, 4 Drawing Sheets

VOLTAGE CONVERTOR FOR A PORTABLE ELECTRONIC DEVICE

FIELD OF THE INVENTION

This invention relates in general to alternating current (AC) convertors for use with standard AC power sources, and in particular to AC voltage convertors for recharging batteries in portable electronic devices.

BACKGROUND OF THE INVENTION

Charging circuits for batteries which are internally installed in portable electronic devices have become relatively small. There are today portable electronic devices which have such circuits built into the device, and which have retractable AC prongs for making a connection to a standard AC voltage source. An example of such a device is an emergency flashlight having a built in charging circuit with retractable prongs. There are other devices which have a charging circuit built into a separate unit which is intended for semi-permanent mounting to a wall mount AC plate, and into which a portable electronic device, such as a hand vacuum cleaner is placed for storage and charging. In this example, the charger/external charger unit provides conversion of the electricity to a safe, low voltage which is coupled to the portable unit by contacts on the external charger which connect to contacts on the portable electronic device. The contacts of the external charger are typically slidably mated to the contacts of the portable device.

Small portable electronic devices, such as pagers, cassette tape players, and radio headphones have typically been designed to operate with one to four small batteries, such as AA or AAA batteries. Because the required charging circuitry is large in relationship to the size of the unit and adds cost to the unit, such portable items have not typically been provided with internal charging circuitry. In the case of pagers, size is of significant competitive importance. Pagers have generally been designed to be smaller, even though they are becoming more complex. Also, the battery life of conventional one-way pagers has become long enough that many types of small pagers are no longer designed with external contacts for recharging in a external charger. For example, some conventional one-way pagers require new primary batteries only once a month.

At this time, new technology is allowing for two way pagers, which require higher voltage and which consume significantly more power than one-way pagers. These voltage and power requirements increase the size of the pager, when, for example, AA batteries are used instead of AAA batteries, and the battery life of the larger AA batteries can still be unsatisfactory, for example only two weeks, when primary AA cells are used to power the pager. An alternative is provide for the use of smaller, AAA size rechargeable batteries and provide external contacts so that primary AAA batteries don't have to be used. However, many users have become used to the convenience of not having to use an external charger for charging their pager. The inconvenience of a typical transformer charger having a cord is exacerbated when a user travels, which is increasingly more frequent these days.

Thus, what is needed is a more convenient means of recharging small batteries in a small portable electronic device.

DETAILED DESCRIPTION OF THE DRAWINGS

Figure 1:
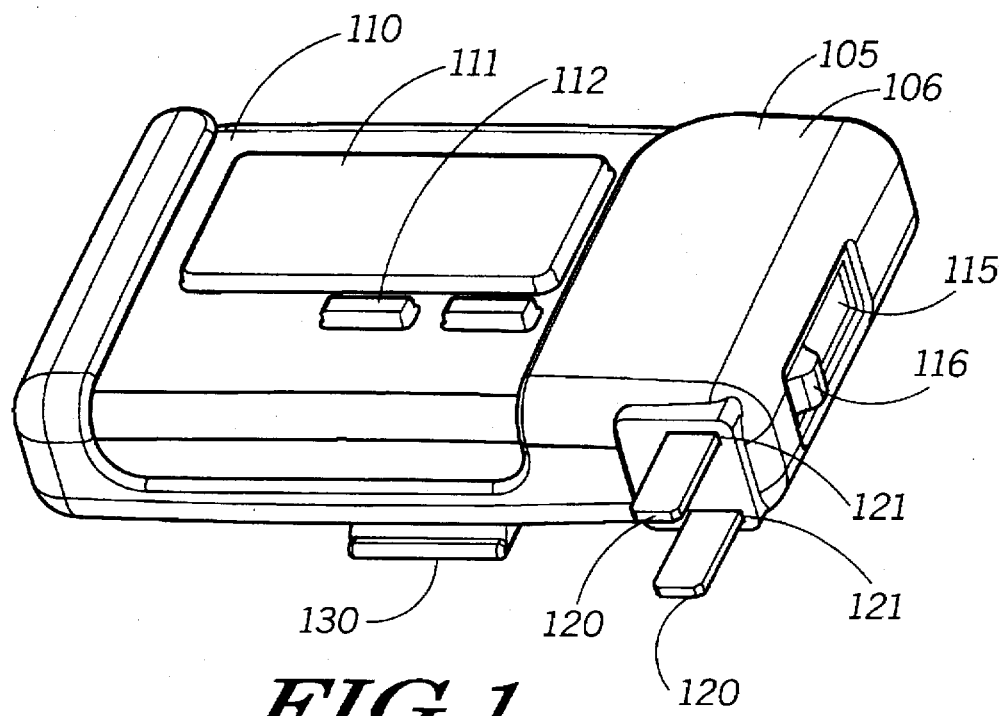
FIG. 1 is an isometric view of a portable electronic device holster 105 holding a pager 110, in accordance with the preferred embodiment of the present invention.

Referring to FIG. 1, an isometric view of a portable electronic device holster 105 holding a pager 110 is shown, in accordance with the preferred embodiment of the present invention. The pager 110 is a conventional two way selective call radio device, such as the Tango™ model pager manufactured by Motorola, Inc., of Schaumburg, Ill., having a display 111 and user controls 112. The pager 110 houses one or more conventional rechargeable batteries (not shown in FIG. 1). The holster 105 comprises a holster busing 106 and an alternating current (AC) voltage convertor 115 housed and captured within one end of the holster housing 106. The holster 105 provides a unique combination of functions. A first function provided by the holster 105 is holding and protecting the pager 110 while it is being carried by a user. A conventional attachment (or belt) clip on the back of the holster housing 106 provides for attachment of the holster 105 to a variety of convenient items, such as a belt, pocket, or a briefcase divider, for carrying the pager 110 securely. A lower portion 130 of the attachment clip is shown in FIG. 1. A second function provided by the portable electronic device holster 105 is providing a down converted voltage used for charging the one or more rechargeable batteries in the pager 110. Located at the bottom of the holster housing 106 are two slots 121 through which AC prongs 120 are extended for recharging the pager 110. The AC prongs 120 are compatible with a standard 120 volt, 60 Hertz AC power socket as used throughout the United States of America. In accordance with the preferred embodiment of the present invention, the AC voltage convertor 115 includes a knob 116 which extends through a slot in the end of the holster.

Figure 2:
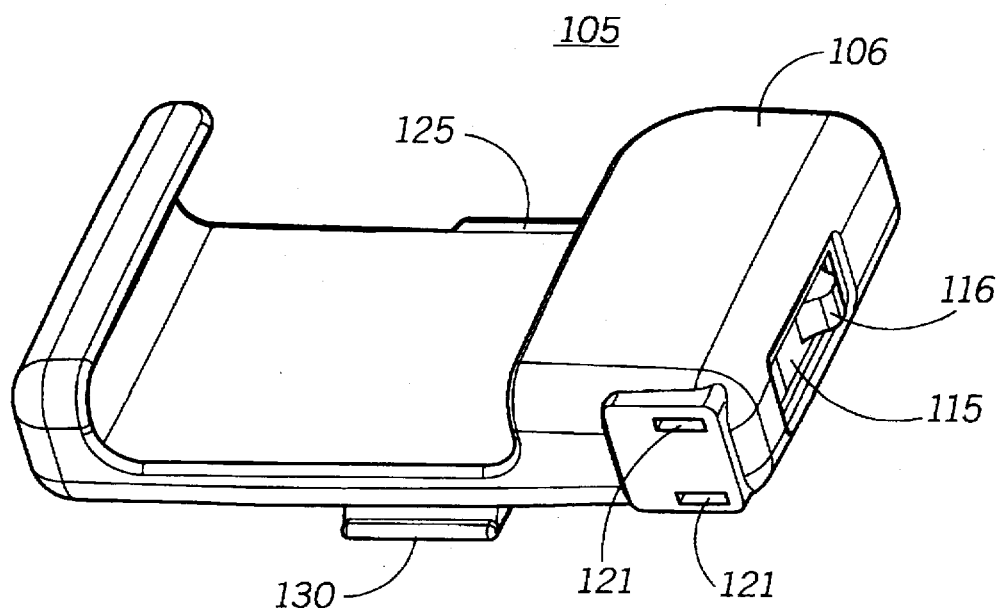
FIG. 2 is an isometric view of the portable electronic device holster 105, in accordance with the preferred embodiment of the present invention.

Referring to FIG. 2, an isometric view of the portable electronic device holster 105 is shown in accordance with the preferred embodiment of the present invention. The holster 105 is the same holster as shown in FIG. 1, with the pager removed to more clearly show the holster housing 106. An upper portion 125 of the attachment clip is shown in FIG. 2. The AC prongs 120 are not shown in FIG. 2 because they are retracted into the holster 105, as they would typically be when the pager 110 is not being charged (the pager 110 can be either in or out of the holster 105 when the pager 110 is not being charged). For charging the pager 110 when it installed in the holster 105, the user extends the AC prongs 120 out of the bottom of the holster housing 106 into an extended position by pushing the knob 116 towards the bottom of the holster 105 and inserting the AC prongs 120 into a standard power socket (not shown in FIG. 2) while pushing on the holster 105 and pager 110 combination. To stop the recharging of the pager 110 and configure the holster 105 for normal carrying of the pager 110, the user removes the AC prongs 120 from the standard AC power socket by pulling on the holster 105, then retracts the AC prongs 120 into a retracted position within the bottom of the holster 105 by pushing the knob 116 towards the top of the holster 105.

It will be appreciated that the holster 105 could alternatively be designed to hold other types of portable electronic devices, such as a cassette tape player, a micro cassette tape player, a broadcast radio, or a calculator, and that it would provide the same unique combination of carrying and recharging functions described above when the other type of portable electronic device is correspondingly designed to include rechargeable batteries and contacts for coupling the down converted voltage from the holster 105 to the portable electronic device. It will be further appreciated that the holster 105 could be of different form factor to accommodate a pager of a different form factor, such as a pager having a display on the top instead of the front, and that the AC voltage convertor 115 could be, for instance, at the bottom of the holster 105 with the prongs extending to the side.

Figure 3:
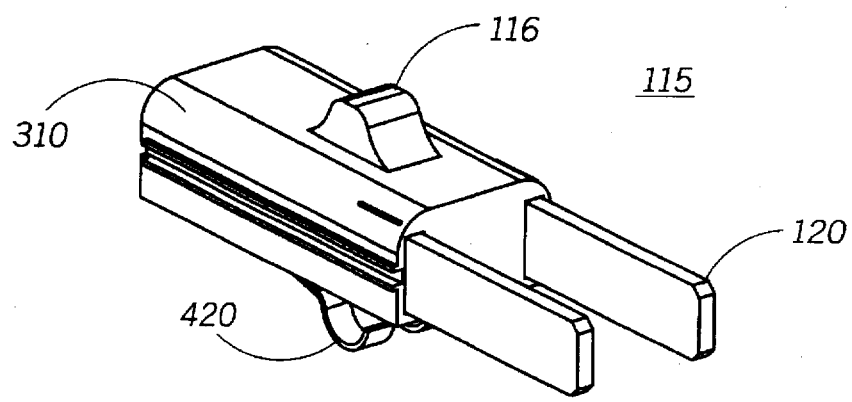
FIG. 3 is an isometric view of the AC voltage convertor 115, in accordance with the preferred embodiment of the present invention.
Figure 4:
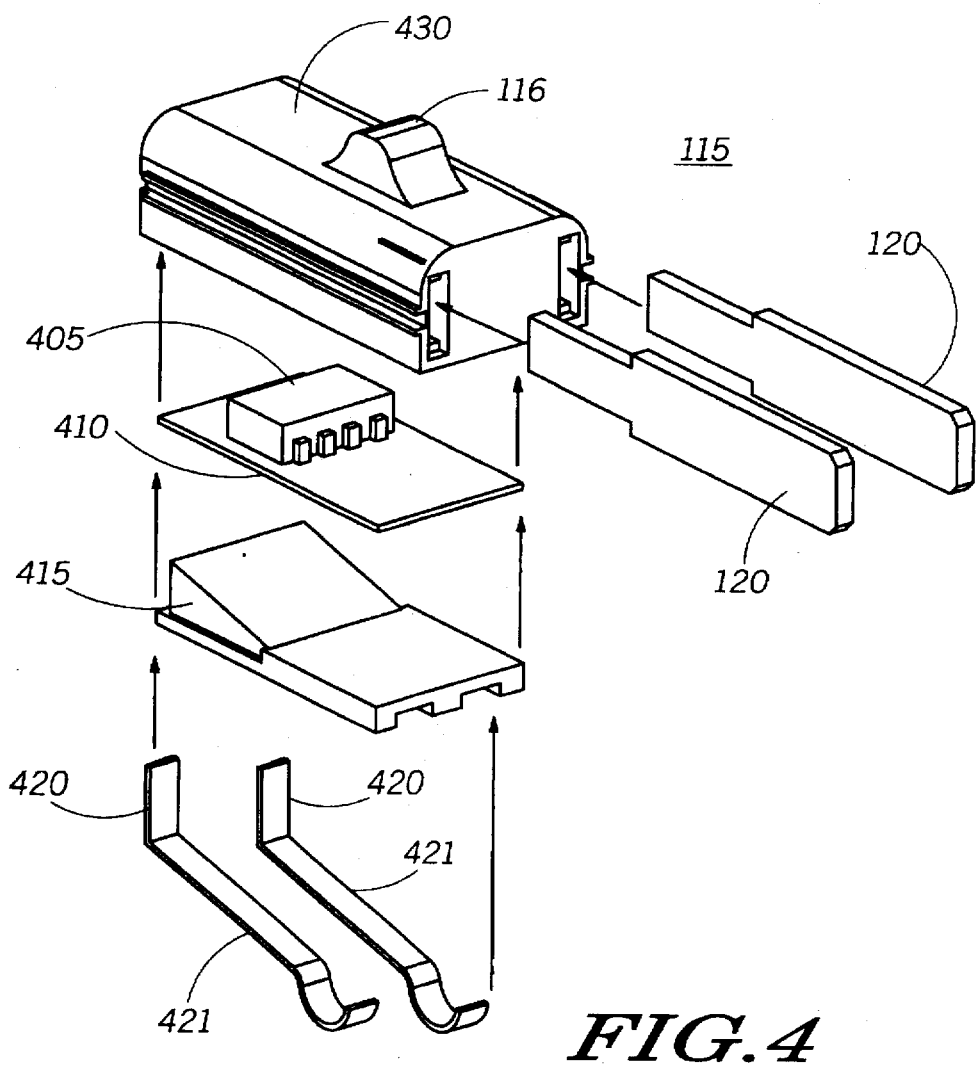
FIG. 4 is an exploded view of the AC voltage convertor 115, in accordance with the preferred embodiment of the present invention.

Referring to FIGS. 3–4, an isometric view of the AC voltage convertor 115 is shown in FIG. 3 and an exploded view of the AC voltage convertor 115 is shown in FIG. 4, in accordance with the preferred embodiment of the present invention. The AC voltage convertor 115 comprises the two AC prongs 120, a convertor housing 310, a convertor circuit assembly 410, a housing top 415, and two low voltage contacts 420. The convertor housing 310 comprises a housing body 430 and a housing top 415 which are preferably plastic and which are permanently mated to each other when the AC voltage convertor 115 is assembled, preferably by ultrasonic welding. The convertor circuit assembly 410 comprises a transformerless integrated circuit (IC) 405, as well as other electronic parts (not shown) which are more fully described below with respect to FIG. 5. When the AC voltage convertor is assembled, the two AC prongs 120 are captivated in the housing body 430 and electrically coupled to the convertor circuit assembly 410, and the convertor circuit assembly 410 is housed within the housing body 430 and electrically coupled to the two low voltage contacts 420, which have a contactor portion 421 external to the convertor housing 310. The external portion of the two low voltage contacts 420 make contact with two corresponding electrically conductive contacts 522 (not shown in FIGS. 3–4) embedded flush with a surface of the pager 110 when the pager 110 is inserted into the holster 105, in a manner well known to one of ordinary skill in the art.

It will be appreciated that the two low voltage contacts 420 and the electrically conductive contacts 522 could be substantially different without significantly altering the benefits of the second embodiment of the present invention. For example, two low voltage contacts 420 could be pins and the electrically conductive contacts 522 could be sockets recessed in the pager 110.

It will be appreciated that the holster 105 can be alternatively designed so that the AC prongs 120 or AC voltage convertor 115 can be swiveled or rotated from a non-charging position which is the retracted position to a charging position which is the extended position by a user. When the AC convertor is in the retracted position, an overall form factor of the holster 105/pager 110 combination is provided which makes the combination more convenient to carry when the AC voltage convertor 115 is in the extended position. For example, when the AC voltage convertor 115 is in the charging position, the AC prongs are in the configuration substantially as shown in FIG. 1, and when the AC voltage convertor is in the non-charging position, the AC prongs 120 are swiveled into a cavity in the end of the holster housing 106, and the holster 105 would appear susbstantially the same as in FIG. 2, without the knob 116 and slots 121.

Figure 5:
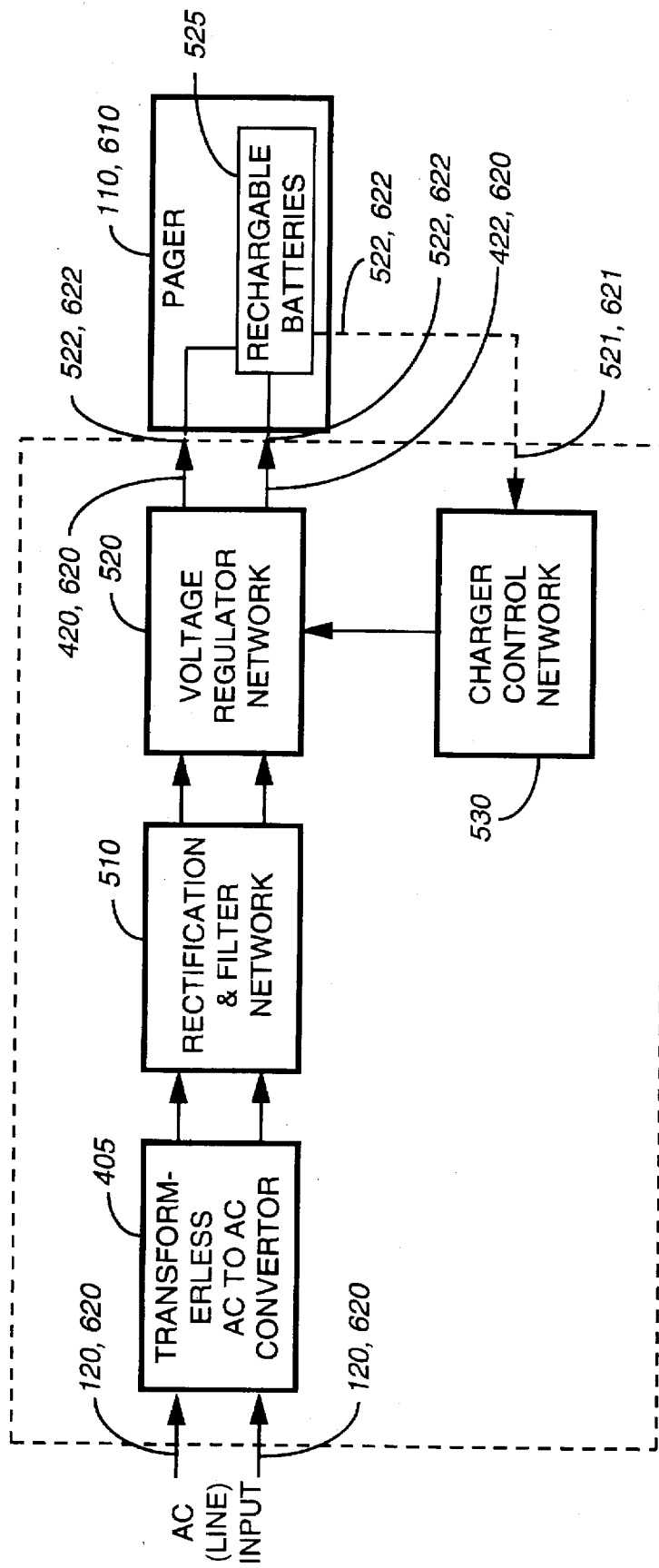
FIG. 5 is an electrical block diagram of the AC voltage convertor 115, AC voltage convertor 615, pager 110, and pager 610, which are shown in FIGS. 1–4 and 6–8, in accordance with the preferred and alternative embodiments of the present invention.

Referring to FIG. 5, an electrical block diagram of the AC voltage convertor 115 and pager 110 is shown, in accordance with the preferred and a first alternative embodiment of the present invention. The AC voltage convertor 115 comprises the two AC prongs 120, the transformerless IC 405, a rectification and filter network 510, a voltage regulator network 520, a charger control network 530, and the two low voltage contacts 420 in accordance with the preferred embodiment of the present invention. Electrically, the AC voltage convertor 115 is an AC to direct current (DC) regulator of conventional design for charging the rechargeable batteries 525 in the pager. The transformerless IC 405 is preferably a conventional UCC3889 integrated circuit AC to AC convertor, manufactured by Unitrode, Inc., of Marrimack, N.H. Conventional electronic elements such as resistors, diodes, and capacitors (not shown in FIG. 5) are coupled to the transformerless IC 405 to set nominal operating parameters of the transformerless IC 405. The transformerless IC 405 is an AC voltage down converting circuit which converts the approximately 120 volts root mean square (rms) AC voltage coupled by the two AC prongs 120 to the transformerless IC 405 from the standard AC power socket to a lower AC voltage of approximately 6 volts rms, which is coupled to the rectification and filter network 510. The rectification and filter network 510 comprises conventional passive electronic components such as diodes, resistors, and capacitors, for rectifying and filtering the voltage coupled from the two AC prongs 120. The rectified and filtered voltage, which is predominantly a direct current (DC) voltage, is coupled from the rectification and filter network 510 to the voltage regulator network 520, which is preferably a conventional LM317BT voltage regulator integrated circuit manufactured by Motorola of Schaumburg, Ill. and which is coupled to associated components such as resistors and diodes which establish nominal operational parameters such as the output voltage. The voltage regulator network 520 regulates the filtered and rectified DC voltage and couples the regulated voltage to the two low voltage contacts 420. The voltage regulator network 520 is coupled to the charger control network 530, which controls the regulated voltage coupled to the two low voltage contacts 420 in response to an ambient temperature sensed by the charger control network 530. The charger control network 530 comprises conventional electronic components such as transistors, resistors, capacitors, and a thermistor coupled in a manner well known to one of ordinary skill in the art to control the regulated voltage to provide an optimum trickle charge voltage for the rechargeable batteries in the pager 110 by changing the regulated voltage in response to the ambient temperature. The output current of the AC voltage convertor 115 is approximately 10 milliamps, which is adequate to trickle charge the rechargeable batteries in the pager 110 and for some pagers is sufficient to provide additional current for activating at least a standby portion of electronic circuitry in the portable electronic device, for example receiver and monitor circuits. The small amount of current needed for these functions allows very small electronic components to be used within the AC voltage convertor 115. It will be appreciated that additional electronic components, not shown in FIG. 5 can be included in the AC voltage convertor 115, such as conventional input surge protectors and other safety and self protection devices.

In accordance with the first alternative embodiment of the present invention, the charger control network 530 is a circuit which controls the regulated voltage in response to an electrical output coupled from the pager 110 to the AC voltage convertor 115 by a spring contactor 521 similar to the two low voltage contacts 420, which connects to a corresponding electrically conductive contact 522 on the pager 110 when the pager 110 is inserted into the holster 105.

It will be appreciated that additional AC prongs are provided in the AC voltage convertor 115 when required in order to meet the standards of a country. It will be further appreciated that the AC prongs 120 are of different form factor than those illustrated and the convertor circuit assembly 410 is of a conventional design appropriate to meet the voltage and frequency standards of a country.

In summary, a portable electronic device holster 105 has been described in accordance with the preferred embodiment of the present invention. The holster 105 comprises a holster housing 106 and an AC voltage convertor 115. The holster housing 106 is for carrying a portable electronic device by a user. The AC voltage convertor 115, which is captured within the holster housing 106 comprises a voltage convertor housing 310, at least two AC prongs 120, a voltage down convertor circuit 405, and at least two low voltage contacts 420. The at least two AC prongs 120 extend from the voltage convertor housing 310 and are for connecting to a standard AC power socket. The voltage down convertor circuit 405 is mounted within the voltage convertor housing 310 and generates a down converted voltage from a standard AC voltage coupled from the standard AC power socket by the at least two AC prongs 120. The at least two low voltage contacts 420 are coupled to the voltage down convertor circuit 405 and couple the down converted voltage to electrically conductive contacts 522 on the portable electronic device. The electrically conductive contacts 522 and the at least two low voltage contacts 420 are connected when the portable electronic device is inserted into the holster housing 106. The AC voltage convertor 115 can be extended for charging the portable electronic device and can be retracted otherwise.

In comparison to prior art battery chargers for pagers, which have typically used a transformer for AC voltage conversion and a desk top charger for connecting the recharging power to the pager, the holster 105 provides a smaller overall size (in comparison to a prior art desk top charger and pager combination), lower cost, and more convenient approach to recharging batteries in a pager or other portable electronic device. Unlike prior art desktop chargers, the AC voltage convertor 115 in the holster 105 is typically carried around attached to the pager 110, and is therefore conveniently available. In contrast, prior art desk top chargers typically are larger and include an AC cord or a wall transformer unit with a cord. When the pager 110 is inserted into the holster 105, the holster 105 and pager 110 combination is very conveniently plugged into an AC power socket, such as those found at counter height in kitchens, bathrooms, etc. The AC voltage convertor 115 and pager 110 combination also eliminates the need for replacing primary batteries as in some prior art pagers, except as a very infrequent maintenance action. Another advantage of the preferred embodiment of the present invention is that the incorporation of the AC voltage convertor 115 into the holster 105 as opposed to, for example, including it inside the pager 110, avoids increasing the size of the pager 110 to accommodate the AC voltage convertor 115 with the AC prongs 120.

Figure 6:
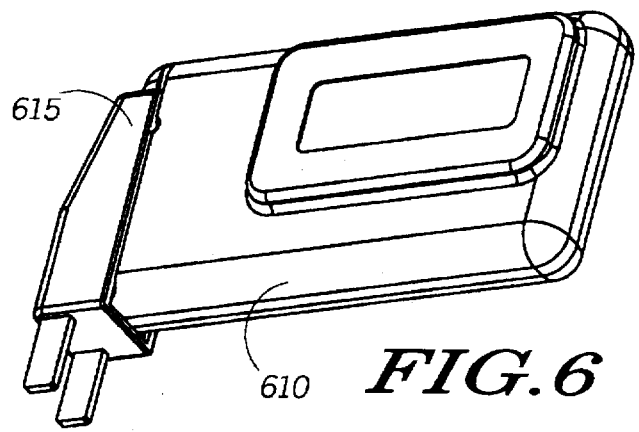
FIGS. 6–8 are isometric views of an AC voltage convertor 615 and pager 610, in accordance with the second alternative embodiment of the present invention.
Figure 8:
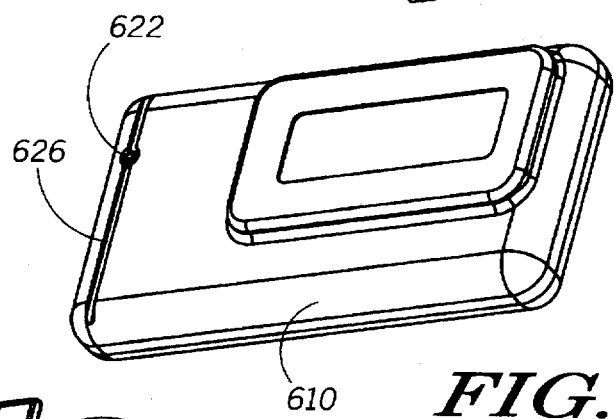
Figure 7:
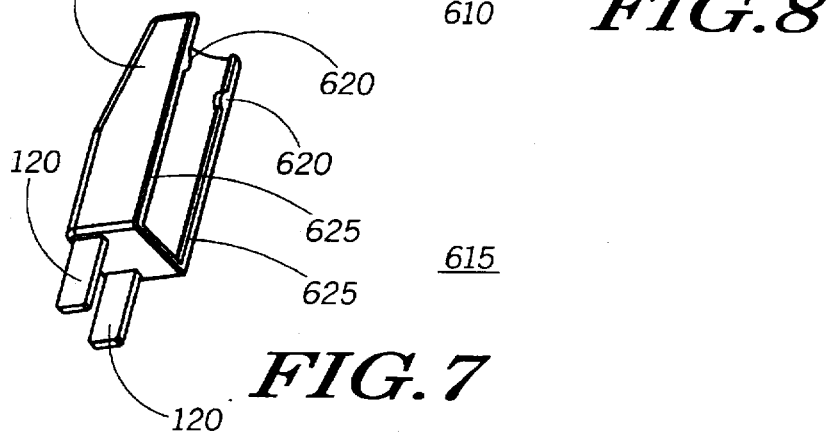

Referring to FIGS. 6–8, isometric views of an AC voltage convertor 615 and pager 610 are shown, in accordance with the second alternative embodiment of the present invention. The AC voltage convertor 615 is an AC voltage down convertor which is slidably attachable to the pager 610. In FIG. 6, the AC voltage convertor 615 is shown attached to the pager 610. FIG. 7 shows the AC voltage convertor 615 separated from the pager 610. The AC voltage convertor 615 comprises a housing having two ridge features 625, two low voltage contacts 620 which protrude slightly from the ridge features 625, and two AC prongs 120 protruding from a housing of the AC voltage convertor 615. FIG. 8 shows the pager 610, which has two grooves 626 in opposing surfaces of the pager 610. One of the two grooves 626 is shown in FIG. 8. Embedded below the surface of the pager 610, within each of the two grooves 626, is an electrical contact 622, which is connected to one of the low voltage contacts 620 when the AC voltage convertor 115 is attached to the pager 610. In use, the AC voltage convertor 615 is attached to the pager 610 by sliding the ridge features 625 into the groove features 626, causing the housing of the AC voltage convertor 615 to forcibly spread slightly apart when the protruding low voltage contacts 620 engage the groove features 626. When the AC voltage convertor 615 has been slid all the way onto the pager 610, the protruding low voltage contacts 620 snap into the recesses in which the contacts 622 are located, making electrical connection therewith and also retaining the AC voltage convertor 615. The pager 610 with the slidably attached AC voltage convertor 615 can then be plugged into a standard AC power socket for recharging the batteries 525 within the pager 610. When the pager 610 is to be carried by the user, the AC voltage convertor 615 can be removed by the user by sliding it off the pager 610. The pager 610 can then be inserted into a pager holster of conventional design.

Referring again to FIG. 5, the electrical block diagram shows the architecture of the AC voltage convertor 615 and the pager 610 in accordance with the second alternative embodiment of the present invention. The electrical architecture of the AC voltage convertor 615 and the pager 610 is identical to that of the AC voltage convertor 115 and the pager 110; only the architecture of the mechanics differ, as described above.

It will be appreciated that the AC voltage convertor 615 can alternatively be designed so that the AC prongs 120 can be swiveled or rotated from a charging position to a non-charging position by a user which provides an overall form factor which is more convenient to carry when the AC voltage convertor 615 is left attached to the pager 610. For example, when the AC voltage convertor 615 is in the charging position, the AC prongs 120 are in the configuration substantially as shown in FIG. 7, and when the AC voltage convertor 615 is in the non-charging position, the AC prongs 120 are susbstantially parallel to the pager 610.

It will be appreciated that other architectural arrangements of the recharging circuitry in the AC voltage convertor 115, 615 and pager 110, 610 can be used without significantly affecting the benefits of the present invention. For example, the rectification and filter network 510, the voltage regulator network 520, and the charger control network 530 could be located in the pager 110, 610 instead of inside the AC voltage convertor 115, 615, in which case the two low voltage contacts 420, 620 would be coupled to the output of the transformerless IC 405 instead of the voltage regulator network 520. It will be further appreciated that the transformerless IC 405 could alternatively be a transformer when the amount of power required for recharging is small enough to allow the required transformer to fit within holster 105 without substantially affect the size of the holster 105, particularly in the front to back dimension, or alternatively to conform to a housing of an AC voltage convertor 615 which permits direct attachment to the pager 610 substantially as described herein.

It will be appreciated that the AC voltage convertor 615 could be alternatively designed to be attached to other types of portable electronic devices, such as a cassette tape player, a micro cassette tape player, a broadcast radio, or a calculator, and that it would provide the same unique combination of functions described above when the other type of portable electronic device is correspondingly designed to include rechargeable batteries and contacts for coupling the down converted voltage from the AC voltage convertor 615 to the portable electronic device. It will be further appreciated that the AC voltage convertor 615 could be of different form factor to accommodate a pager of a different form factor, such as a pager having a display on the top instead of the side, and that the AC voltage convertor 615 could be attached, for instance, at the bottom of the pager 610 with the AC prongs 120 extending to the side. It will be further appreciated that the two low voltage contacts 620 and the electrically conductive contacts 622 could be substantially different without significantly altering the benefits of the second embodiment of the present invention. For example, the two low voltage contacts 620 could be pins and the electrically conductive contacts 622 could be sockets recessed in the pager 610.

It will be appreciated that additional AC prongs are provided in the AC voltage convertor 615 when required in order to meet the standards of a country. It will be further appreciated that the AC prongs 120 are of different form factor than those illustrated and the convertor circuit assembly 410 is of a conventional design appropriate to meet the voltage and frequency standards of a country.

In summary, a detachable alternating current (AC) voltage convertor 615 for a portable electronic device, has been described, which comprises a convertor housing 616, at least two AC prongs 120, and a voltage down convertor circuit 405. The convertor housing 616 is removably attachable to the portable electronic device. When attached to the portable electronic device, the AC voltage convertor 615 holds the portable electronic device while the AC voltage convertor 615 is connected to a standard AC power socket. The at least two AC prongs 120, which extend from the convertor housing 616, are for connecting the AC voltage convertor 615 to the standard AC power socket. The voltage down convertor circuit 405 within the convertor housing 616 is for generating a down converted voltage from a standard AC voltage coupled from the standard AC power socket by the at least two AC prongs 120. At least two low voltage contacts 620 are coupled to the voltage down convertor circuit 405 for coupling the down converted voltage to contacts 622 on the portable electronic device when the AC voltage convertor is attached to the portable electronic device.

In comparison to prior art battery chargers for pagers, which have typically used a transformer for AC voltage conversion and a desk top charger for connecting the recharging power to the pager, the AC voltage convertor 615 provides a smaller, lower cost, and more convenient approach to recharging batteries in a pager or other portable electronic device. Unlike prior art desktop chargers, the AC voltage convertor 615 is easy to carry around separate from the pager 610, or can be carried around attached to the pager 610 when the pager 610 is carried, for instance in a purse or briefcase. In contrast, prior art desk top chargers typically are larger and include an AC cord or a wall transformer unit with a cord. When attached to the pager 610, the AC voltage convertor 615 and pager 610 combination is very conveniently plugged into an AC power socket, such as those found at counter height in kitchens, bathrooms, etc. The AC voltage convertor 615 and pager 610 combination also eliminates the need for replacing primary batteries as in some prior art pagers, except as a very infrequent maintenance action. Another advantage of the second alternative embodiment of the present invention is the that the separation of the AC voltage convertor 615 from the pager 610, as opposed to, for example, including it inside the pager 610, avoids increasing the size of the pager 610 to accommodate the AC voltage convertor 615 with the AC prongs 120.

We claim:

1. A portable electronic device holster, comprising:

a holster housing for carrying a portable electronic device by a user and for holding the portable electronic device while the portable electronic device is being charged; and an AC voltage convertor captured within said holster housing, said AC voltage convertor comprising:

a convertor housing;

at least two AC prongs for connecting to a standard AC power socket extending from said convertor housing;

a voltage down convertor circuit mounted within said convertor housing for generating a down converted voltage from a standard AC voltage coupled from the standard AC power socket by the at least two AC prongs; and at least two low voltage contacts coupled to said voltage down convertor circuit for coupling the down converted voltage to battery charging contacts on the portable electronic device, wherein said battery charging contacts and said at least two low voltage contacts are connected when the portable electronic device is inserted into said holster housing, and wherein said AC voltage convertor can be extended for charging the portable electronic device and can be retracted otherwise.

2. The portable electronic device holster according to claim 1, wherein the at least two low voltage contacts are doubly insulated from the at least two AC prongs.

3. The portable electronic device holster according to claim 1, wherein said holster housing is designed to hold a selective call radio.

4. The portable electronic device holster according to claim 1, wherein said holster housing comprises an attachment clip.

5. The portable electronic device holster according to claim 1, wherein said voltage down convertor circuit is a transformerless integrated circuit.

* * * * *